(12) United States Patent
Kildal et al.

(10) Patent No.: US 10,684,765 B2
(45) Date of Patent: Jun. 16, 2020

(54) CAUSING TRANSMISSION OF A MESSAGE

(75) Inventors: Johan Kildal, Helsinki (FI); Jyrki Veikko Leskelä, Haukipudas (FI); Mika Allan Salmela, Oulu (FI); Jarmo Antero Nikula, Jääli (FI); Aki Happonen, Kiminki (FI)

(73) Assignee: Nokia Technologies Oy, Espoo (FI)

( * ) Notice: Subject to any disclaimer, the term of this patent is extended or adjusted under 35 U.S.C. 154(b) by 1332 days.

(21) Appl. No.: 13/163,070

(22) Filed: Jun. 17, 2011

(65) Prior Publication Data
US 2012/0319960 A1 Dec. 20, 2012

(51) Int. Cl.
*G06F 3/0487* (2013.01)
*H04M 1/725* (2006.01)
(Continued)

(52) U.S. Cl.
CPC .......... *G06F 3/0487* (2013.01); *G06F 1/1684* (2013.01); *G06F 1/1694* (2013.01); *G06F 1/1698* (2013.01); *G06F 3/017* (2013.01); *G06F 3/03* (2013.01); *G06F 3/0346* (2013.01); *H04M 1/7253* (2013.01); *H04M 1/72547* (2013.01); *H04M 1/0268* (2013.01); *H04M 2250/12* (2013.01); *H04M 2250/22* (2013.01); *H04M 2250/64* (2013.01)

(58) Field of Classification Search
CPC ............. G09G 2380/02; G06F 1/1652; G06F 2203/04102; G06F 1/1684; G06F 3/041; G06F 3/0414; G06F 3/0487; G06F 3/017; G06F 3/03; G06F 3/0346; G06F 1/1698; G06F 1/1694; H04M 1/7253; H04M 1/72547; H04M 1/0268; H04M 2250/22; H04M 2250/64; H04M 2250/12

USPC ................................ 345/173, 156–158, 184
See application file for complete search history.

(56) References Cited

U.S. PATENT DOCUMENTS 6,297,838 B1    10/2001   Chang et al.
7,109,967 B2     9/2006   Hioki et al.
(Continued)

FOREIGN PATENT DOCUMENTS

DE      10 2007 04859        4/2009
WO      WO 96/38833 A1      12/1996
(Continued)

OTHER PUBLICATIONS

World News—Entertaining News Stories, Pictures and Videos; The Future of Telephones and Messaging; [Online]; Posted Jun. 7, 2009; Retrieved from the Internet <URL: http://fastactionnews.com/?p=853>; 6 pages.

(Continued)

*Primary Examiner* — Jimmy H Nguyen
(74) *Attorney, Agent, or Firm* — Alston & Bird LLP

(57) ABSTRACT

A method comprises receiving an indication of a bending force in excess of a first predetermined threshold being applied to a communications device, and responding to receipt of the indication of the bending force in excess of the first predetermined threshold by causing a message to be transmitted from the communications device to a remote receiver, or responding to subsequent receipt of an indication that the bending force has subsequently fallen below a second predetermined threshold by causing a message to be transmitted from the communication device to a remote receiver.

17 Claims, 5 Drawing Sheets

(51) Int. Cl.
  *G06F 3/03*    (2006.01)
  *G06F 3/0346*  (2013.01)
  *G06F 3/01*    (2006.01)
  *G06F 1/16*    (2006.01)
  *H04M 1/02*    (2006.01)

(56) References Cited

U.S. PATENT DOCUMENTS

| | | | |
|---|---|---|---|
| 2007/0252721 A1* | 11/2007 | Geurts | G06F 3/0325 340/4.31 |
| 2009/0140997 A1* | 6/2009 | Jeong et al. | 345/173 |
| 2010/0011291 A1* | 1/2010 | Nurmi | G06F 3/0414 715/702 |
| 2010/0110018 A1 | 5/2010 | Faubert et al. | |
| 2010/0120470 A1* | 5/2010 | Kim et al. | 455/566 |
| 2010/0141605 A1 | 6/2010 | Kang et al. | |
| 2010/0317409 A1 | 12/2010 | Jiang et al. | |
| 2011/0057873 A1 | 3/2011 | Geissler et al. | |
| 2011/0193771 A1 | 8/2011 | Chronqvist | |

FOREIGN PATENT DOCUMENTS

| | | |
|---|---|---|
| WO | WO 2005/093548 A1 | 10/2005 |
| WO | WO 2010/004080 A1 | 1/2010 |
| WO | WO 2010/070550 A1 | 6/2010 |
| WO | WO 2011/005318 A2 | 1/2011 |

OTHER PUBLICATIONS

Dachselt, R., et al.; "Natural Throw and Tilt Interaction between Mobile Phones and Distant Displays"; CHI 2009; Boston, MA, USA; 6 pages.

Ye, Z., et al.; CHI 2010: Student Research Competition (Spotlight on Posters Days 1 & 2); "Cobra: Flexible Displays for Mobile Gaming Scenarios"; CHI 2010; Atlanta, GA, USA; pp. 4363-4367.

Supplementary European Search Report for Application No. 12 80 1039 dated Nov. 25, 2014.

International Search Report and Written Opinion for Application No. PCT/IB2012/052699 dated Sep. 28, 2012.

Office Action for corresponding European Application No. 12801039.4 dated Jan. 9, 2018, 7 pages.

Office Action for corresponding Vietnamese Application No. 1-2013-03904 dated Oct. 26, 2018 with English Translation, 4 pages.

* cited by examiner

CAUSING TRANSMISSION OF A MESSAGE

FIELD OF THE INVENTION

The invention relates to causing the transmission of a message. More specifically, the invention relates to the transmission of a message from a communications device to a remote receiver.

BACKGROUND TO THE INVENTION

It is known for communications devices to send messages to other communications devices and other types of remote receivers. Usually these messages are transmitted in response to a user providing a touch input to a touch screen or in response to the depression of a physical key. Example embodiments of the invention provide new ways for a user to cause messages to be transmitted.

SUMMARY OF THE INVENTION

According to a first aspect, this specification describes a method comprising receiving an indication of a bending force in excess of a first predetermined threshold being applied to a communications device, and responding to receipt of the indication of the bending force in excess of the first predetermined threshold by causing a message to be transmitted from the communications device to a remote receiver, or responding to subsequent receipt of an indication that the bending force has subsequently fallen below a second predetermined threshold by causing a message to be transmitted from the communication device to a remote receiver.

According to a second aspect, this specification describes apparatus comprising at least one processor and at least one memory having computer-readable instructions stored thereon, the computer-readable instructions, when executed by the at least one processor, causing the at least one processor to receive an indication of a bending force in excess of a first predetermined threshold being applied to a communications device, and to respond to receipt of the indication of the bending force in excess of the first predetermined threshold by causing a message to be transmitted from the communications device to a remote receiver, or to respond to subsequent receipt of an indication that the bending force has subsequently fallen below a second predetermined threshold by causing a message to be transmitted from the communication device to a remote receiver.

According to a third aspect, this specification describes a non-transitory computer readable memory medium having computer readable instructions stored thereon, the computer readable instructions, when executed by at least one processor, causing the at least one processor to receive an indication of a bending force in excess of a first predetermined threshold being applied to a communications device, and to respond to receipt of the indication of the bending force in excess of the first predetermined threshold by causing a message to be transmitted from the communications device to a remote receiver, or to respond to subsequent receipt of an indication that the bending force has subsequently fallen below a second predetermined threshold by causing a message to be transmitted from the communication device to a remote receiver.

According to a fourth aspect, this specification describes computer-readable instructions, which, when executed by at least one processor, cause the at least one processor to perform a method according to the first aspect.

According to a fifth aspect, this specification describes apparatus configured to receive an indication of a bending force in excess of a first predetermined threshold being applied to a communications device, and to respond to receipt of the indication of the bending force in excess of the first predetermined threshold by causing a message to be transmitted from the communications device to a remote receiver, or to respond to subsequent receipt of an indication that the bending force has subsequently fallen below a second predetermined threshold by causing a message to be transmitted from the communication device to a remote receiver.

According to a sixth aspect, this specification describes apparatus comprising means for receiving an indication of a bending force in excess of a first predetermined threshold being applied to a communications device, and means for responding to receipt of the indication of the bending force in excess of the first predetermined threshold by causing a message to be transmitted from the communications device to a remote receiver, or means for responding to subsequent receipt of an indication that the bending force has subsequently fallen below a second predetermined threshold by causing a message to be transmitted from the communication device to a remote receiver.

BRIEF DESCRIPTION OF THE FIGURES

For a more complete understanding of example embodiments of the present invention, reference is now made to the following description taken in connection with the accompanying drawings in which.

DETAILS DESCRIPTION OF THE EXAMPLE EMBODIMENTS

Figure 1:
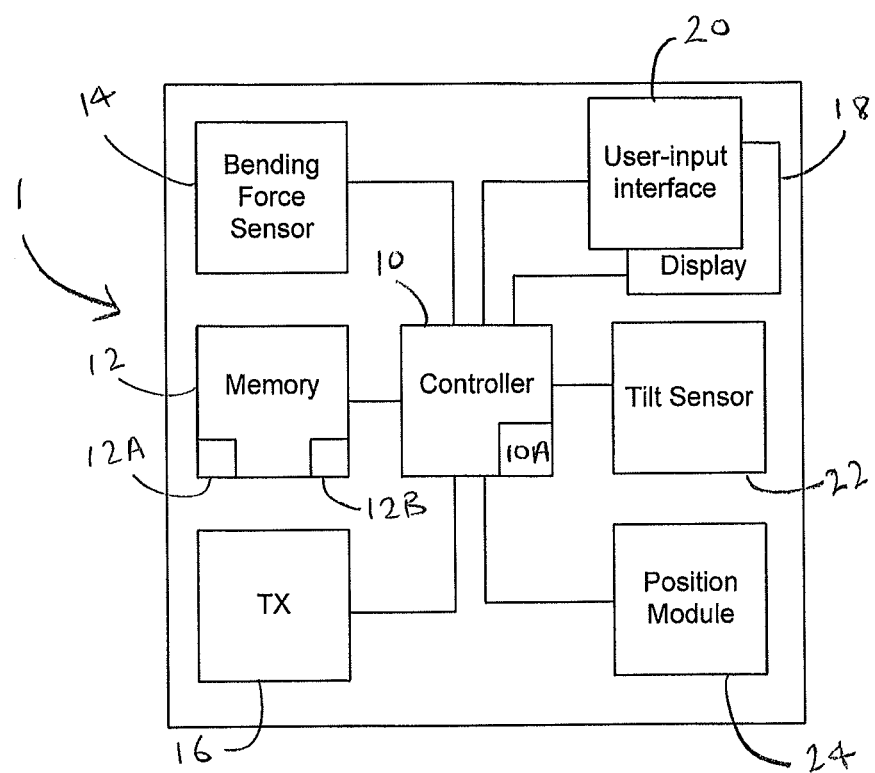
FIG. 1 is a simplified schematic illustration of a communications device according to example embodiments of the invention.

In the description and drawings, like reference numerals refer to like elements throughout.

FIG. 1 is a simplified schematic illustration of a communications device 1 according to example embodiments of the invention.

The communications device comprises a controller 10 and a memory 12. The communications device 1 also comprises a bending force sensor 14, a transmitter 16, a display panel 18, and a user input interface 20. In some example embodiments the communications device is flexible or bendable. The device may also be elastic such that it returns to its original configuration after it has been bent. The construction of such devices is known to the person skilled in the art and so a detailed description of this is not described herein.

The bending force sensor 14 is operable to detect the application of a bending force to the communications device 1 and is operable to output or provide a signal indicative of the application of the bending force. In some example embodiments, the bending force sensor 14 may operate only in a binary fashion. In such examples, the bending force sensor 14 may be configured to provide no signal when no bending force, or a bending force below a predetermined threshold, is applied to the communications device 1 and to provide a constant signal when a bending force above the predetermined threshold is applied to the communications device 14. Alternatively, a constant signal may be provided when no bending force, or a bending force below the predetermined threshold, is provided and no signal may be provided when a bending force above the threshold is applied. In other example embodiments, the bending force sensor 14 may be operable to provide a signal that is indicative of a magnitude of the bending force applied to the communications device 1.

It will be appreciated that the bending force sensor 14 may be one of many different types and may be arranged within the device in dependence upon the way in which the sensor 14 operates. For example, in embodiments in which the communications device 1 is flexible, the bending force sensor 14 may be a strain gauge, such a mechanical strain gauge, a resistive strain gauge, a semiconductor strain gauge or a capacitive strain gauge. In example embodiments in which the communications device 1 is not flexible, the bending force sensor 14 may comprise multiple sensor elements distributed throughout the communications device so as to detect pressure applied to the surface of the device by a user's fingers, the pressure being applied in a manner such that, if it was applied to a flexible device, the device would bend.

The transmitter 16 is operable to transmit radio frequency (RF) signals wirelessly, directly or indirectly, to one or more remote receivers (not shown). The remote receivers may be associated with any number of types of computing apparatuses including, but not limited to, other communications devices, web servers and other service providers.

The display panel 18 may be of any suitable type and is operable to output images, videos and text to a user of the device 1. The user-input interface 20 is operable to receive user inputs and to provide signals indicative of such. The user-input interface 20 may comprise a touch-sensitive transducer. In some example embodiments, the display panel 18 and the touch sensitive transducer 20 may be arranged so as to form a touchscreen 18, 20. In other example embodiments, the user-input interface 20 may be of another type, such as but not limited to depressible keys, a scroll wheel and a voice input interface.

The controller 10 is operable under the control of computer readable code 12A, which is stored in the memory 12, receive signals from and to send control signals to various ones of the other components 14, 16, 18, 20, 22, 24 of the communications device 1. The controller 10 comprises at least one processor 10A which is operable to execute the computer readable instructions 12A stored in the memory. The controller 10 may also comprise one or more applications specific integrated circuits (not shown).

The controller 10 is operable to receive one or more signals from the bending force sensor 14 and to determine therefrom when a bending force is applied to the communications device 1. In embodiments in which the bending force sensor 14 operates in a binary fashion, the controller 10 is operable to determine, based on the fact that a signal is received from the bending force sensor 14, that a bending force in excess of a predetermined threshold is being applied the communications device 1. When no signal is received from the bending force sensor 14, the controller 10 determines that no bending force is being applied to the communications device 1 or that the bending force is less than the predetermined threshold. It will be appreciated that controller 10 may alternatively determine the presence of a bending force in excess of the predetermined threshold when a signal stops being received from the bending force sensor 14.

In other example embodiments in which the signal received from the bending force sensor 14 is indicative of the magnitude of the bending force currently applied to the communications device 1, the controller 10 is operable to determine the magnitude of the bending force currently applied to the device 1 based on the signals received from the bending force sensor 14.

The controller 10 is operable to cause RF signals to be transmitted wirelessly by the transmitter 16. The controller 10 is also operable to control the output of the display 18, by causing images, text and videos etc to be displayed on the display 18. The controller 10 is operable to receive from the user-input interface 20 signals indicative of user-inputs being provided via the user-input interface 20. In embodiments in which the user-input interface 20 is part of a touchscreen 18, 20, the controller 10 is operable to determine a location at which touch inputs are incident on the touchscreen 18, 20. The controller 10 is operable also to control other components of the communications device 1 based on user-inputs received via the user-input interface 20. The controller 10 is also operable to retrieve content items (not shown) from the memory 12 and to cause these to be transmitted by the transmitter 16 to a remote receiver as part of a message. The controller 10 is also operable to cause the items, or icons representing content items and the like to be displayed on the display 18.

The memory 12 may comprise one or more distinct memory modules and may comprise any combination of ROM, RAM, EEPROM, Flash memory or memory of any other kind. The memory 12 may also be operable to store one or more applications for execution by the controller 10.

In some embodiments, the communication device 1 may also comprise one or more tilt sensors 22 which send to the controller 10 signals for allowing determination of an orientation of the device 1. The communications device 1 may also comprise a position module 24, for example, a global positioning system module, for determining a location of the communications device. The communications device 1 may also be able to receive signals indicative of locations of remote receivers. Signals received at the device 1 are received via a receiver (not shown) which may be combined with the transmitter 16 to form a transceiver.

The communications device may be of any type such as, but not limited to, a mobile telephone, a personal digital assistant and a tablet computer.

It will be appreciated that the device 1 of FIG. 1 is merely an example and that the device 1 may not include all of the components depicted and/or may include additional components.

Figure 2C:
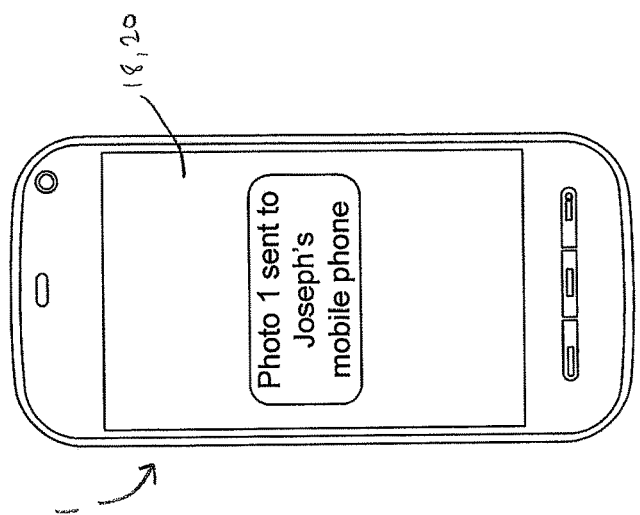
FIGS. 2A to 2C illustrate an operation of the communications device according to example embodiments of the invention.
Figure 2B:
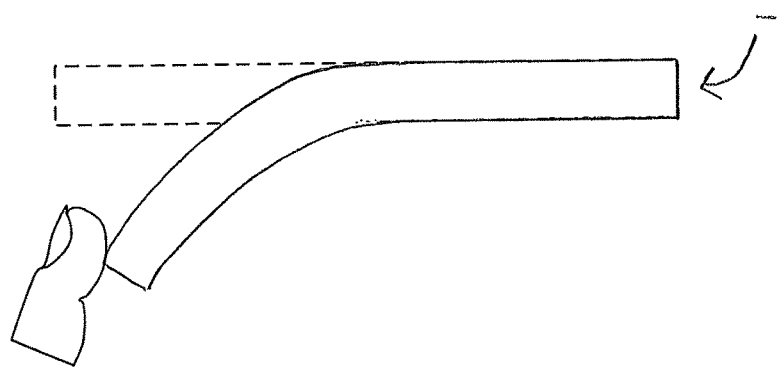
Figure 2A:
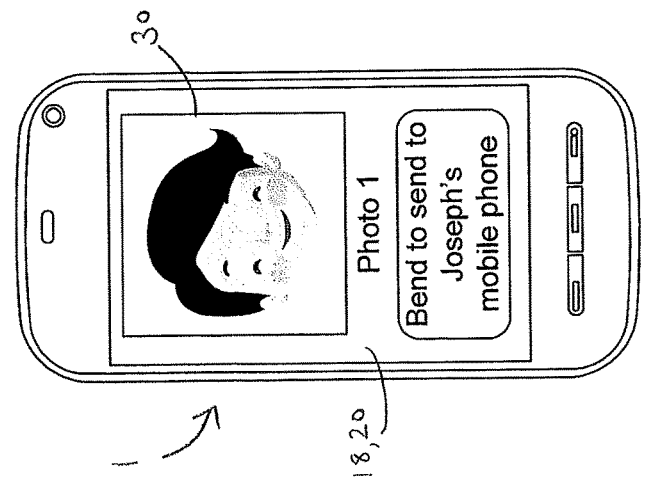

FIGS. 2A to 2C illustrate an operation of the communications device according to example embodiments of the invention. In FIG. 2A, the controller 10 is causing a content item, in this example a picture, to be displayed on the display. As can be seen from text displayed on the display 18, the content item is to be sent to a remote receiver, which is in this example is "Joseph's Mobile Phone". The user of the communications device 1 may have provided suitable user-inputs for identifying the remote receiver to which it is required to send a message.

Next, as can be seen FIG. 2B, which is a side-view of the device 1, the user applies a bending force to the device 1. In this example, the device 1 is flexible, and so the application of the bending force causes the device 1 to bend. As the bending force is applied to the communications device 1, the bending force sensor 14 provides to the controller 10 one or more signals indicative of a bending force being applied to the communications device 1. In some embodiments, the bending force sensor 14 provides a signal to the controller 10 only when the bending force exceeds a predetermined threshold. In other embodiments, the bending force sensor 14 provides a signal to the controller 10 which is indicative of the magnitude of the bending force applied to the communications device 1. The controller 10 receives the signals from the bending force sensor 14 and, when it is determined that a bending force is in excess of a predetermined threshold, the controller 10 responds by causing the content item displayed on the display to be transmitted by the transmitter 16 as part of a message to the identified remote receiver. FIG. 2C show an example state of the display 18 following transmission of the message.

In the example embodiment described above, the controller 10 causes the message to be transmitted in response to a determination that a bending force in excess of a predetermined threshold has been applied to a communications device 1. In other example embodiments, however, a message may be caused to be sent when, following a determination that the bending force is in excess of a first predetermined threshold, it is determined that the bending force has subsequently been reduced to below the first predetermined threshold. Consequently, in such embodiments, a message is not caused to be transmitted as the device 1 is being bent, but instead as the device is being returned to its original form. In these embodiments, the controller 10 responds to a determination that the bending force has exceeded the first predetermined threshold and has subsequently been reduced below the first predetermined threshold by causing the message to be transmitted to the remote receiver. In some embodiments, the first and second predetermined thresholds may have the same value. The threshold below which the bending force must fall before the message is transmitted may be different, for example higher, to the first threshold. The first predetermined threshold may be selected such that an accidental bending force, such as may be applied when the device 1 is in the user's pocket, is insufficient to cause a message to be transmitted. The threshold may correspond to a detected bending force, for example, in the range of 5N to 15N being applied to the device.

In some embodiments, the device may include a proximity sensor and/or a light sensor for enabling a determination as to when the device 1 is in a user's pocket. The operability of the device to send a message may be disabled when it is determined that the device is in the user's pocket.

In example embodiments in which the at least one signal received from the bending force sensor 14 is indicative of the magnitude of the bending force applied to the communications device 1, the controller 10 may be operable to adapt the message that is to be sent based on the determined magnitude. In some embodiments, the controller 10 adapts the message by including a data item in the message. The data item may be a rating which is indicative of a property associated with contents of the message. For example, the rating may indicate a level of importance associated with the message. Similarly, the rating may be indicative of an excitement level that the user of the communications device 1 feels in relation to the contents of the message. The rating that is included in the message is indicated to a user associated with the remote receiver upon receipt of the message.

Let us consider an example in which there are four different ratings relating to the importance of the contents of the message. These may be low importance, normal importance, high importance and urgent importance. The controller 10 first determines the maximum magnitude of the applied bending force based on one or more signals received from the bending force sensor 14. Next, the controller 10 compares the determined maximum magnitude and with a plurality of reference force ranges, the number of ranges being equal to the number of different ratings. If the maximum magnitude is in a first, lowest range (i.e. above a first threshold, but below a second threshold), the controller 10 is operable to adapt the message by including a data item indicative of a first rating (in this example, low importance). If the determined maximum magnitude is in a second higher range (i.e. above the second threshold but below a third threshold), the controller 10 is operable to adapt the message to include a data item indicative of a second rating (e.g. normal importance). Similarly, if maximum magnitude is in a third range (i.e. above the third threshold but below a second threshold) or a fourth range (e.g. above the fourth threshold), the controller 10 is operable adapt the message by including a data item indicative of a third rating (e.g. high importance) or a fourth rating (e.g. urgent importance) respectively.

In other examples, the controller 10 may be operable to adapt the content item that is to be sent in the message based on the determined magnitude. For example, the user may indicate that they wish to send an "emoticon" and the controller 10 may adapt the "emoticon" on the basis of the determined magnitude. For example, a bending force in a first range may result in a smiling emoticon, and a bending force in a second range which is higher than the first range may result in a laughing emoticon.

In embodiments in which the communications device 1 is flexible, the user is able to judge the amount of bending force that they are applying based on the amount which the communications device is being caused to bend. In embodiments in which the device is not flexible, feedback, such as audio feedback, tactile feedback, visual feedback or any combination thereof, may be provided to allow the user to determine more easily the amount of bending force that they are applying.

In the example of FIGS. 2A to 2C, the contents of the message (which may comprise for example text, an image, a video, an audio clip of any combination thereof) is selected or entered by the user prior to applying the bending force to the communications device 1. In other embodiments, however, the contents of the message may not be selected by the user but may instead be automatically created or provided in dependence on the application that is currently being executed on the communications device 1. For example, different applications may interpret the provision to the device 1 of a bending force as an instruction to send a particular type of message. In some applications, such as an instant messaging application, the provision of a bending force may be understood by the controller as an instruction to send an "emoticon" to a remote receiver. In some examples, actual emoticon that is transmitted may be determined based on the magnitude of the applied bending force. For example, a large bending force may represent an angry emoticon and a low bending force may represent a happy emoticon.

In another example, a social networking application may be being executed on the communication device 1. While the application is being executed, the controller 10 may be operable to recognise receipt from the bending force sensor 14 of a signal indicative of a force in excess of the first predetermined threshold as being a command to send a nudge, a wink, a poke, or the like. In addition, the controller 10 may be operable to adapt the message based on the determined magnitude, such that that the nudge, poke, wink etc. has a rating associated therewith.

In the above examples, the user selects the remote receiver to which the message is to be sent. In other example embodiments, however, the controller 10 may instead determine the identity of the remote receiver to which the message is to be sent based on an application being executed by the device 1. For example, when a social networking application is being executed, the messages sent as a result of a bending force applied to the device 1 may automatically be sent to a server associated with the social networking application.

Figure 3C:
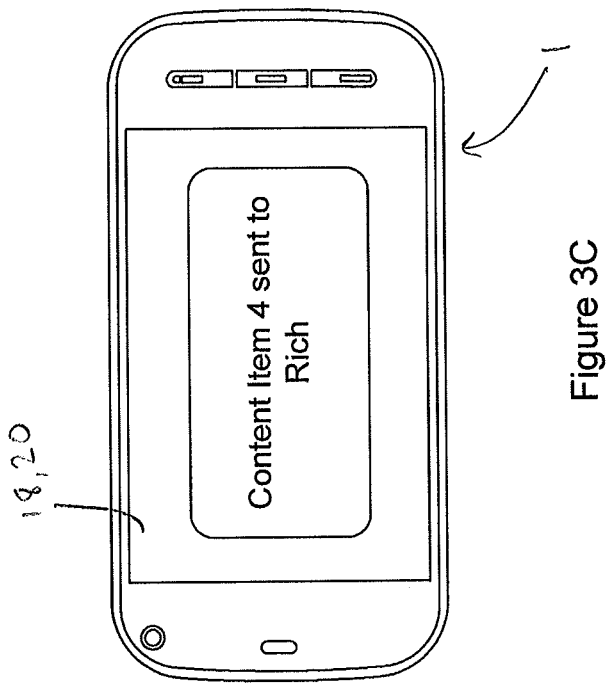
FIGS. 3A to 3C illustrate another operation of the communications device according to example embodiments of the invention.
Figure 3A:
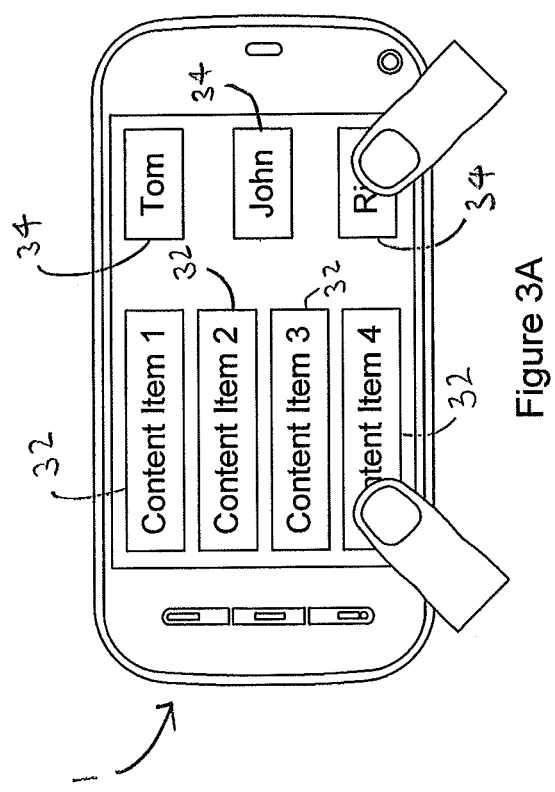
Figure 3B:
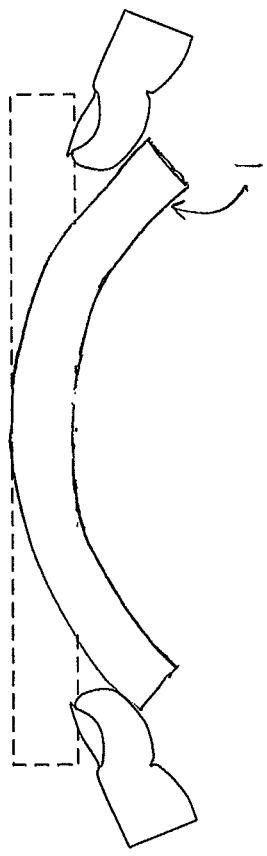

FIGS. 3A to 3C depict another operation of a communications device according to example embodiment of the invention.

In FIG. 3A, the controller 10 causes a plurality of icons 32, 34 to be displayed on the display 18. A first set 32 of these icons each represent a content item for inclusion in a message. A second set 34 of icons each represents a remote receiver to which a message can be sent. In FIG. 3A, the user is simultaneously applying a first touch input to an icon of the first set 32 (in this example, "Content Item 4") and a second touch input to an icon of the second set 34 (in this example, "Rich").

Next, as can be seen in FIG. 3B, while continuing to apply the first and second touch inputs to the selected icons 32, 34, the user applies a bending force to the device 1. A controller 10 responds to receipt of the signal indicative of a bending force in excess of a predetermined threshold being applied to the communications device 1 by causing a message, which includes the selected content item, to be sent to a remote device identified by the second touch input. FIG. 3C depicts the state of the display 18 following transmission of the message.

In the example of FIG. 3A, the icons 32 representing the content items are displayed on a first side of the display 18 and the icons 34 representing the remote receivers are displayed on a second side of the display 18. In this way, the user is able to hold the communications device 1 naturally in two hands and to use their thumbs to select the desired content item and remote receiver, and subsequently to bend the device with the aid of their fingers located on the rear of the device 1. Although this may be advantageous, it will be appreciated that the icons may be arranged in a different way.

In the examples of FIGS. 3A to 3C, both the content item and the identity of the remote receiver are indicated by touch inputs provided at the same time as the provision of the bending force. However, it will be appreciated that either the content item for inclusion in the message or the remote receiver to which the message is to be sent may have been selected prior to providing the bending force to the communications device 1. Thus, in such examples, the user may apply only one touch input, selecting either of the content item or the remote receiver, at the time of bending the remote device 1.

To describe, in other words, the examples described with reference of FIGS. 3A to 3C, the controller 10 is operable to cause a message to be transmitted to a remote receiver in response to a signal indicative of a bending force in excess of a predetermined threshold, the contents of the message and/or the identity of the remote receiver being determined based on one or more touch inputs applied at the time of bending the device 1.

Figure 4:
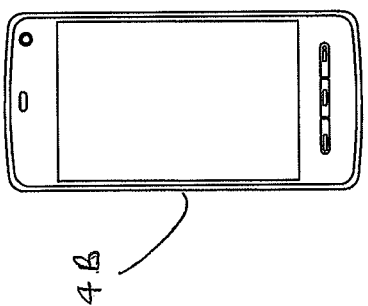
FIG. 4 illustrates another operation of the communications device according to example embodiments of the invention.
Figure 4:
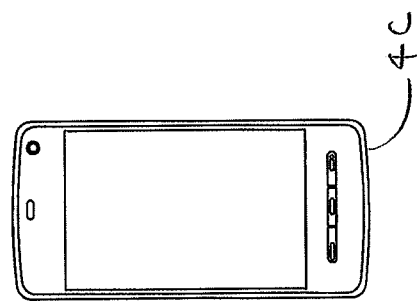
Figure 4:
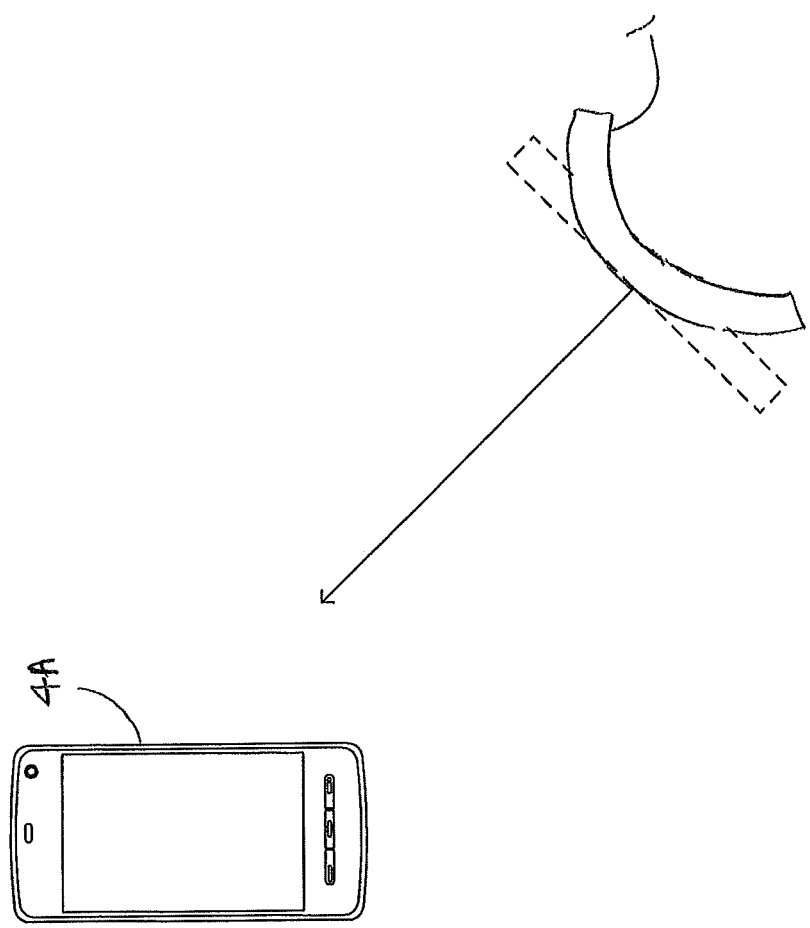

FIG. 4 shows another example operation according to the invention. The Figure depicts the communications device 1 according to example embodiments of the invention and three remote receiving devices 4A, 4B, 4C to which a message may be transmitted.

In this example, the contents of the message to be sent may be determined in any of the ways described with reference to FIGS. 2 and 3. However, the identity of the remote receiver is identified based, at least in part, on the orientation of the communications device 1. In such examples, the user may select a particular remote receiver by orienting the communication device in a particular way in relation to the selected remote receiver 4A. For example, if a user wishes to transmit the message to a particular device, they may orientate the device such that the display 18 is facing towards the selected remote receiving device.

In some examples, the controller 10 may use one or more directional antennas to determine which remote receiving devices 4A, 4B, 4C are in a particular direction relative to the communications device. These antennas may be configured to operate using Bluetooth® Low Energy protocol, or using any other suitable type of short-range wireless protocol. In these embodiments, when the controller 10 determines that a remote receiving device is located in a direction towards which the communications device 1 is oriented, the controller 10 causes the user to be notified of such, for example, using the display, a loud speaker or in any suitable manner. Once the user's device 1 is correctly orientated toward the remote receiver of interest, the user applies a bending force to the device 1. The controller 10 responds to the indication that a bending force in excess of a predetermined threshold has been applied by causing a message to be sent to the selected remote receiver.

In other example embodiments the controller 10 may be operable to indentify which devices are located in a direction in which the communications device is oriented using a different technique. For example, the controller may use information regarding locations of various remote receiving devices (which may have been received via the transceiver) in conjunction with information regarding the location of communications device 1 itself (which may have been determined using the position module) and information regarding the orientation of the communications device (which may have been determined using the tilt sensor).

In any of the examples described with reference to FIG. 4, where more than one remote receiver is located in the direction of orientation of the communications device 1, the controller 10 may allow the user to select the remote receiving device to which the message is to be sent.

Although not described with reference to FIGS. 3A to 3C or FIG. 4, it will be appreciated that the controller 10 may be operable to cause the message to be transmitted in response to receiving, subsequent to receiving an indication that a bending force in excess of predetermined threshold is being applied, an indication that the bending force has been reduced back below the predetermined threshold. It will also be appreciated that the controller 10 may be operable to adapt the message, for example by including a data element as described above, based on a detected magnitude of the applied bending force.

Figure 5:
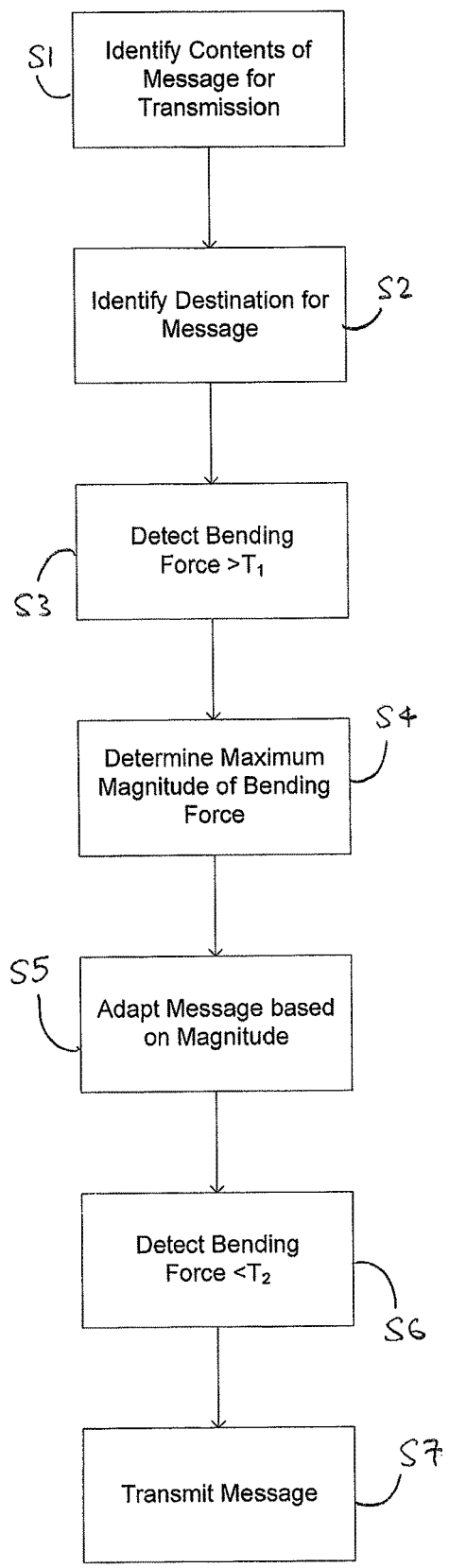
FIG. 5 is a flow chart illustrating methods according to example embodiments of the invention.

FIG. 5 is a flow chart illustrating methods according to example embodiments of the invention.

In step S1, the controller 10 identifies the contents to be included in a message. As described above this may be based on a content item which is currently displayed on the display 18. Alternatively it may be identified based on a touch input which selects a particular content item at the time of provision of the bending force. Alternatively, the contents of the message may be dependent on an application currently being executed.

In step S2, the controller 10 identifies the destination to which a message is to be sent. This may be based on a prior selection by the user, based on an application currently being executed on the communications device, based on a touch input which identifies the remote receiver and which is incident on the touchscreen at the time of provision of the bending force, or based on the current orientation of the device.

In step S3 a controller 10 receives an indication from the bending force sensor 14 that a bending force in excess of a first predetermined threshold is being applied to the device 1.

In some embodiments, the method then proceeds to step S7, in which the message including the identified contents is caused to be transmitted to the identified destination.

In other embodiments, the method proceeds to step S4 in which the maximum magnitude of the bending force is determined by the controller 10 based on signals received from the bending force sensor 14.

In step S5, the controller 10 adapts the message based on the determined magnitude of the bending force. This may include, for example, adding a data item representing a rating to the message or adapting the contents of the message based upon the magnitude.

Subsequently, in step S6, the controller 10 detects, based on signals received from the bending force sensor 14, that the bending force has subsequently been reduced to below the predetermined threshold. In response to step S6 the controller 10 causes the message to be transmitted to the identified remote receiver.

It will be appreciated that the steps of FIG. 5 are an example only. In some embodiments some of the steps (for example, steps S4 to S6) may be omitted and in other examples the steps may be performed in a different order (for example, step S1 being performed after step S2) or at substantially the same time (for example, steps S1 to S3).

Although the example of FIG. 1 shows only a single bending force sensor 14. It will be appreciated that the device 1 may include more than one bending force sensor. Each of these may be arranged so as to detect bending forces along a particular axis. In such embodiments, the adaptation of the message based on the magnitude of the bending force may also be based on the axis along which the bending force is applied. For example, the message may be adapted to include a data item of a first type in response to detection of a bending force along a first axis and to include a data item of a second type in response to detection of a bending force along a second axis.

In some embodiments, the controller 10 may be configured to determine the time taken for the bending force to return from the maximum magnitude to below the second threshold. In these embodiments, the message may be adapted based not only on the maximum magnitude but also on the time taken for the bending force to return from the maximum magnitude to below the second threshold. For example, a first type of data item (for example, an excitement rating) may be included based on the detected magnitude and a second type of data item (for example, an importance rating) may be included based on the determined time. In other embodiments, only a single data item may be included, but this may be based on both the detected magnitude and the time. As such, where an emoticon is included in the message, a time in excess of a predetermined value may result in a "happy" emoticon and a time shorter than a predetermined value may result in a "sad" emoticon. The level of emotion (e.g. smiling, laughing etc or frowning, crying etc) may be based on the detected magnitude.

The above described invention provides a method and apparatus in which the action of pressing "send" is replaced by a form of interaction between user and device that is physical, fun and engaging. In addition the action of providing a bending force to a device is easy and quick to carry out following, for example, the input of a text message and obviates the need to locate and press the "send" button. Also, some embodiments allow the action of sending a message also to associate a rating (such as an importance level) with the message. Thus, the user is not required to search through complex menu systems, or indeed to provide any separate input, in order to associate a rating with the message. Also, in flexible devices, the action of bending the device to send the message gives the user the impression that they are "flicking" the message over to a remote receiver which improves the overall user experience.

It should be realized that the foregoing embodiments should not be construed as limiting. Other variations and modifications will be apparent to persons skilled in the art upon reading the present application. Moreover, the disclosure of the present application should be understood to include any novel features or any novel combination of features either explicitly or implicitly disclosed herein or any generalization thereof and during the prosecution of the present application or of any application derived therefrom, new claims may be formulated to cover any such features and/or combination of such features.

The invention claimed is:

1. A method comprising:
    receiving by a processor a bend indication signal as a function of a bending force being applied to a communications device that is bendable from an initial configuration to a bent configuration in response to a manually applied bending force, wherein the bend indication signal is interpreted as an instruction to transmit a message, wherein the communications device is flexible so as to return back towards the initial configuration on release of the bending force, wherein the bend indication signal is provided by a sensor configured to detect and provide said bend indication signal upon bending from the initial configuration to the bent configuration and from the bent configuration back towards the initial configuration;
    causing by the processor the message to be transmitted from the communications device to a remote receiver in response to the bend indication signal received by the processor, the bend indication signal indicating that the bending force has subsequently fallen below a predetermined threshold corresponding to the communications device being released flexibly from the manually applied bending force to return from the bent configuration towards the initial configuration;
    determining an orientation of the communications device with respect to one or more remote receivers and identifying the remote receiver to which the message is to be transmitted based at least in part on the determined orientation of the communications device with respect to one or more remote receivers, determining a maximum magnitude of the bending force; and prior to causing the message to be transmitted, adapting the message based on the determined maximum magnitude.

2. The method of claim 1 comprising:

receiving an indication of a touch input being incident on a touch-sensitive transducer of the communications device while the bending force is being applied to the communications device, the touch input selecting a content item for inclusion in the message which is caused to be transmitted to the remote receiver.

3. The method of claim 1, wherein the contents of the message is based at least in part on an application currently being executed on the communications device.

4. The method of claim 1, comprising:

receiving an indication of a touch input being incident on a touch-sensitive transducer of the communications device while the bending force is being applied to the communications device, the touch input identifying the remote receiver to which the message is caused to be transmitted.

5. The method of claim 1, wherein the remote receiver to which the message is transmitted is identified based on an application currently being executed on the communications device.

6. The method of claim 1, wherein adapting the message comprises including in the message an information item based on the determined maximum magnitude.

7. The method of claim 1, comprising adapting a content item which is to be included in the message based on the determined maximum magnitude.

8. The method of claim 1, wherein the communications device is flexible.

9. An apparatus comprising at least one processor and at least one memory having computer-readable instructions stored thereon, the computer-readable instructions, when executed by the at least one processor, causing the at least one processor:

to receive by the at least one processor a bend indication signal as a function of a bending force being applied to a communications device that is bendable from an initial configuration to a bent configuration in response to a manually applied bending force, wherein the bend indication signal is interpreted as an instruction to transmit a message, wherein the communications device is flexible so as to return back towards the initial configuration on release of the bending force, wherein the bend indication signal is provided by a sensor configured to detect and provide said bend indication signal upon bending from the initial configuration to the bent configuration and from the bent configuration back towards the initial configuration;

to cause by the at least one processor the message to be transmitted from the communications device to a remote receiver in response to the bend indication signal received by the at least one processor, the bend indication signal indicating that the bending force has subsequently fallen below a predetermined threshold corresponding to the communications device being released flexibly from the manually applied bending force to return from the bent configuration towards the initial configuration;

to determine an orientation of the communications device with respect to one or more remote receivers;

to identify the remote receiver to which the message is to be transmitted based at least in part on the determined orientation of the communications device with respect to one or more remote receivers, to determine a maximum magnitude of the bending force; and prior to causing the message to be transmitted, to adapt the message based on the determined maximum magnitude.

10. The apparatus of claim 9, wherein the computer-readable instructions cause the at least one processor:

to receive an indication of a touch input being incident on a touch-sensitive transducer of the communications device while the bending force is being applied to the communications device, the touch input selecting a content item for inclusion in the message which is caused to be transmitted to the remote receiver.

11. The apparatus of claim 9, wherein the contents of the message is based at least in part on an application currently being executed on the communications device.

12. The apparatus of claim 9, wherein the computer-readable instructions cause the at least one processor:

to receive an indication of a touch input being incident on a touch-sensitive transducer of the communications device while the bending force is being applied to the communications device, the touch input identifying the remote receiver to which the message is caused to be transmitted.

13. The apparatus of claim 9, wherein the remote receiver to which the message is transmitted is identified based on an application currently being executed on the communications device.

14. The apparatus of claim 9, wherein the computer-readable instructions cause the at least one processor to adapt the message by including in the message an information item based on the determined maximum magnitude.

15. The apparatus of claim 9, wherein the computer-readable instructions cause the at least one processor to adapt a content item which is to be included in the message based on the determined maximum magnitude.

16. The apparatus of claim 9, wherein the apparatus is the communications device and is flexible.

17. A non-transitory computer readable medium having computer readable instructions stored thereon, the computer readable instructions, when executed by at least one processor, causing the at least one processor:

to receive by at least one processor a bend indication signal as a function of a bending force being applied to a communications device that is bendable from an initial configuration to a bent configuration in response to a manually applied bending force, wherein the bend indication signal is interpreted as an instruction to transmit a message, wherein the communications device is flexible so as to return back towards the initial configuration on release of the bending force, wherein the bend indication signal is provided by a sensor configured to detect and provide said bend indication signal upon bending from the initial configuration to the bent configuration and from the bent configuration back towards the initial configuration;

to cause by the at least one processor the message to be transmitted from the communications device to a remote receiver in response to the bend indication signal received by the at least one processor, the bend indication signal indicating that the bending force has subsequently fallen below a predetermined threshold corresponding to the communications device being released flexibly from the manually applied bending force to return from the bent configuration towards the initial configuration;

to determine an orientation of the communications device with respect to one or more remote receivers;

to identify the remote receiver to which the message is to be transmitted based at least in part on the determined orientation of the communications device with respect to one or more remote receivers;

to determine a maximum magnitude of the bending force; and prior to causing the message to be transmitted, to adapt the message based on the determined maximum magnitude.

* * * * *